(12) United States Patent
Gerber et al.

(10) Patent No.: US 10,091,193 B2
(45) Date of Patent: Oct. 2, 2018

(54) ONE TIME PASSCODE

(71) Applicant: MasterCard International Incorporated, Purchase, NY (US)

(72) Inventors: Theunis J. Gerber, Wildwood, MO (US); Edward Glassman, Pleasantville, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 146 days.

(21) Appl. No.: 14/983,823

(22) Filed: Dec. 30, 2015

(65) Prior Publication Data

US 2017/0195319 A1    Jul. 6, 2017

(51) Int. Cl.
*H04L 29/06*    (2006.01)
*H04W 12/06*    (2009.01)
*H04W 4/14*    (2009.01)

(52) U.S. Cl.
CPC ........... *H04L 63/0838* (2013.01); *H04W 4/14* (2013.01); *H04W 12/06* (2013.01)

(58) Field of Classification Search
CPC ............. H04L 63/0838; H04L 63/0428; H04L 63/0823; H04L 63/0807; H04L 63/0861; H04W 12/06; H04W 4/14
USPC ........................................................... 726/7
See application file for complete search history.

(56) References Cited

U.S. PATENT DOCUMENTS

| | | | | |
|---|---|---|---|---|
| 2007/0006291 | A1* | 1/2007 | Barari ................... | G06F 21/335 726/10 |
| 2010/0325097 | A1* | 12/2010 | Er .......................... | G06F 21/629 707/702 |
| 2012/0144461 | A1* | 6/2012 | Rathbun ............... | H04L 9/3213 726/5 |
| 2014/0037074 | A1* | 2/2014 | Bravo ................... | H04W 12/06 379/88.01 |
| 2014/0298441 | A1* | 10/2014 | Yamaguchi ......... | H04L 63/0807 726/8 |

* cited by examiner

*Primary Examiner* — Syed Zaidi
(74) *Attorney, Agent, or Firm* — Sheppard Mullin Richter & Hampton LLP

(57) ABSTRACT

A one-time passcode authentication system includes an application server, an authentication server, and an access device, wherein the access includes an authentication engine configured to receive an authentication request from the authentication server and automatically, or in response to a single user input, initiate an access request to the application server, wherein the access request includes a token extracted from the authentication request, and the application server is configured to receive the access request, query the authentication server to authenticate the token, and enable access to an application if the token is authenticated.

18 Claims, 7 Drawing Sheets

ONE TIME PASSCODE

TECHNICAL FIELD

The present disclosure is generally related to authenticating user access. More particularly, the present disclosure is directed to one-time passcode systems and methods.

BACKGROUND

Increasing numbers of computer applications implement features that involve accessing and transmitting protected information. These are increasing areas of interest with respect to financial and healthcare related applications that involve the use of confidential or sensitive information. One mechanism used to implement security in accessing and transmitting electronic information over computer networks is a one-time passcode in which an administrator or user of a particular computer application may initiate a transaction that requires a user (either the same user or a different, external user) to securely access the application to access or transmit electronic data. The administrator or user may initiate a request to generate a one-time passcode, and provide the passcode to the user that will access the application. Typically, the one-time passcode is complicate as to be as secure as possible, and is sent to the target user via email, SMS/text message, or oral communication. The target user must then enter the one-time passcode into the application manually. While the one-time passcode process described may increase data security, the process is complex, requires multiple steps, is arduous and awkward for users, and is prone to mistakes that inhibit access to the application.

SUMMARY

Embodiments disclosed herein are directed towards a one-time passcode authentication system that includes an application server, an authentication server, and an access device. The access device may include an authentication engine, wherein the authentication engine may include a first computer processor and a first non-transitory computer-readable medium having a first computer-executable program embedded thereon, the first computer-executable program being configured to receive an authentication request from the authentication server and initiate an access request to the application server in response to the authentication request, wherein the access request comprises a token extracted from the authentication request. The application server may include a second computer processor and a second non-transitory computer-readable medium having a second computer-executable program embedded thereon, the second computer-executable program being configured to receive the access request, query the authentication server to authenticate the token, and enable access to an application if the token is authenticated.

In some examples, the authentication server may include an authentication data generation component configured to receive an authentication data set from the application server and generate the authentication request based on the authentication data set, such that the authentication request comprises one or more parameters extracted from the authentication data set and the token. The authentication data may include an electronic address that uniquely identifies the access device or a user, such as a phone number, an IP address, or an email address.

In some embodiments, the authentication data generation component may be further configured to encrypt the authentication request and the first computer-executable program is further configured to decrypt the authentication request and the first computer-executable program may be further configured to encrypt the access request, and the second computer-executable program is further configured to decrypt the access request.

Some examples of the system also include a device user interface component, and the first computer-executable program may be further configured to cause the device user interface component to display a prompt, responsive to the authentication request, querying a user to accept the authentication request. The first computer-executable program may be further configured to receive an input message from the device user interface component and initiate the access request to the application server only if the input message indicates that the user accepted the authentication request.

In some embodiments, the device user interface component includes a biometric input device, and the input message comprises a biometric identification, e.g., a fingerprint scanner or a retinal scanner.

Some embodiments of this disclosure are directed towards a computer implemented one-time passcode authentication method. The method may include receiving, with an authentication server, a request data set comprising an authentication request and an identification parameter, wherein the access device identification parameter uniquely identifies the access device or a user and generating, with the authentication server, a token and an authentication data set based on the request data. The method may further include receiving, with the access device, the authentication data set from the authentication server and initiating, with the access device, an access request to an application server responsive to receiving the authentication data set, wherein the access request comprises the token. Some examples of the method also include querying the authentication server to authenticate the token, responsive to receiving the access request and enabling, with the application server, access to an application if the token is authenticated.

The method may also include encrypting the authentication data set or encrypting the access request. Some examples further include displaying, with a user interface configured on the access device, an authentication prompt responsive to receiving the authentication data set. The method may further include receiving, with the user interface, an input message from the user responsive to the authentication prompt and initiating the access request to the application server only if the input message indicates that the user accepted the authentication prompt.

In some embodiments, the method includes receiving, with a biometric input device, a biometric input message from the user responsive to the authentication prompt and initiating the access request to the application server only if the biometric input message authenticates the user.

BRIEF DESCRIPTION OF THE DRAWINGS

Further aspects of the present disclosure will be more readily appreciated upon review of the detailed description of its various embodiments, described below, when taken in conjunction with the accompanying drawings.

The drawings are described in greater detail in the description and examples below. The drawings are not intended to be exhaustive or to limit the various embodiments to the precise form disclosed. It should be understood that embodiments can be practiced with modification and alteration.

DETAILED DESCRIPTION

The details of some example embodiments of the methods and systems of the present disclosure are set forth in the description below. Other features, objects, and advantages of the disclosure will be apparent upon examination of the following description, drawings, examples and claims. It is intended that all such additional systems, methods, features, and advantages be included within this description, be within the scope of the present disclosure, and be protected by the accompanying claims.

In the context of payment transaction processing, secure user authentication systems and methods are generally employed to protect user data and privacy, as will be described in greater detail below. In order to effectuate the authentication of users, proprietary frameworks/software such as secure transport managed file transfer software. Given this reliance upon the transfer of files, monitoring and responding to data network issues, delays, or degradation in an efficient, and in many cases, automated manner is prudent.

Figure 1:
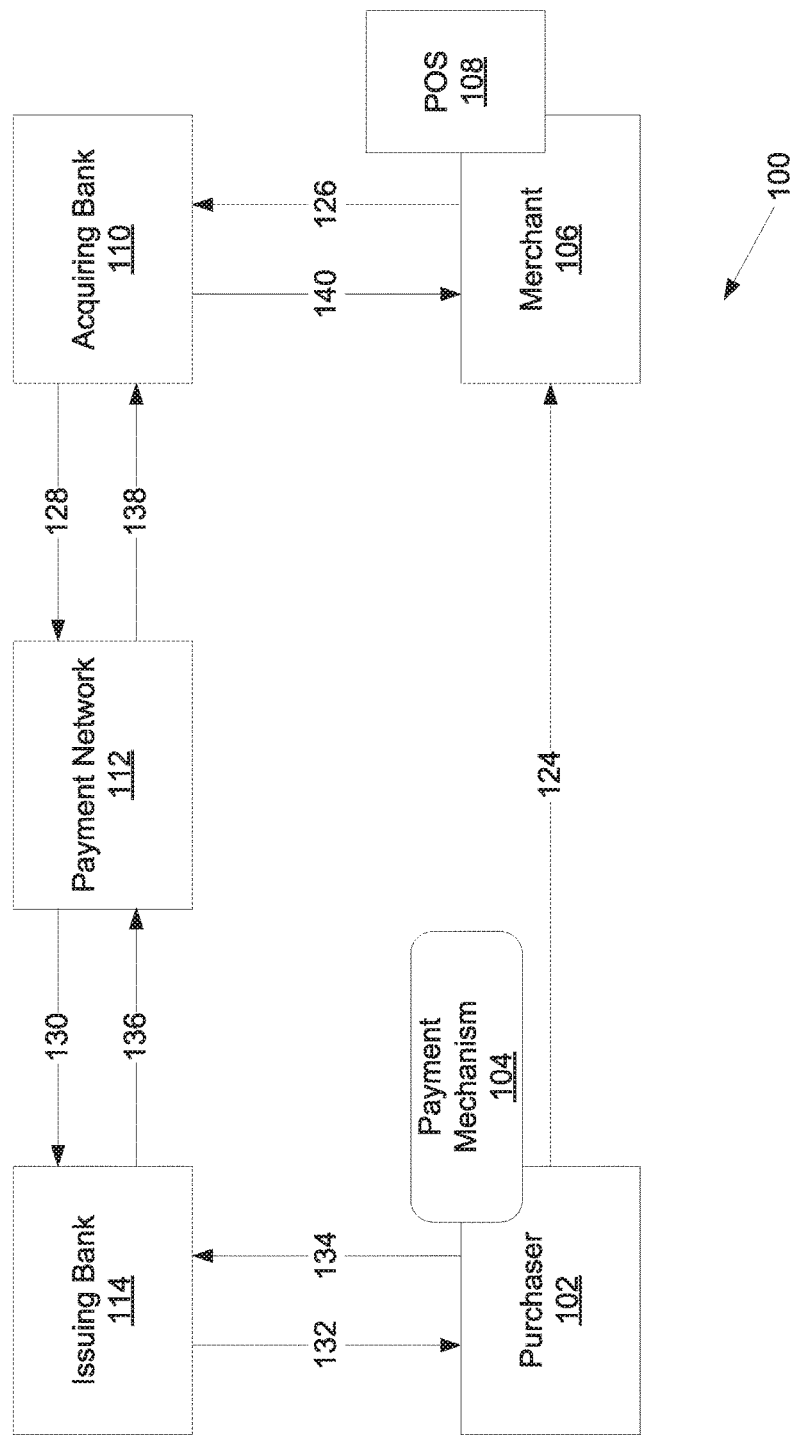
FIG. 1 illustrates an example payment card transaction processing system.

As instances of the present disclosure relate to electronic transaction processing and data generated and collected thereby, the following description provides relevant context for various embodiments described herein. For example, FIG. 1 depicts example payment card transaction processing system 100, which may operate in connection with embodiments of the disclosed systems, methods, and devices. Transaction processing of card-based payments, including electronic payments, may include both an authorization side and a clearing side. System 100 depicts both the authorization side and the clearing side of card-based payment transactions.

The authorization side may involve the process of confirming that a cardholder (or purchaser) has a sufficient line of credit to cover a proposed payment for an item. The clearing side of the transaction may involve reconciliation between an issuing bank (of a payment card) 114 and an acquiring (or merchant) bank 110—e.g., determining the amount owed by issuing bank 114 to acquiring bank 110 or vice versa. Later on, funds may be exchanged between issuing bank 114 and acquiring/merchant bank 110, typically based on the clearing process.

In a typical card-based payment system transaction (or purchase transaction), purchaser 102 presents payment mechanism 104, which in various embodiments is a credit/debit/prepaid card, to merchant 106 for the purchase of an item. This purchase transaction is indicated by arrow 124. The item may be a good and/or a service. "Payment mechanism" 104 or "payment card," as used herein, may also refer to a conventional magnetic-stripe credit or debit card, or similar proximity payment device (utilized on its own or incorporated into another device such as a mobile telephone, personal digital assistant (PDA), etc.) having near field communications (NFC) capabilities, such as a radio frequency identification (RFID) chip implemented therein. "Payment mechanism" 104 or "payment card" may also further refer to virtual or limited-use account numbers and electronic wallets and the like, such as may be used in online transactions.

It will be understood by those of ordinary skill in the art that, prior to the occurrence of such a transaction, purchaser 102 was issued payment mechanism 104 by issuing bank 122. Each payment mechanism 104 is typically associated with an account of purchaser 102, whether purchaser 102 is an individual or some other entity. Likewise, each transaction entered into using payment mechanism 104 is associated with the account. In this regard, for each purchase transaction, payment network 112 processes account transactions by associating each transaction with the corresponding account, as is described in detail below. Periodically, as payment network 112 collects and processes account transactions, the information associated with these transactions is stored and sorted so that it may be subsequently analyzed, dispersed, and the like, as desired.

Moreover, it will be understood that merchant 106 has established a relationship with acquiring bank 110, thereby allowing merchant 106 to receive payment mechanism 104 (e.g., credit/debit cards) as payment for items. That is, acquiring/merchant banks (e.g., 110) and issuing banks (e.g., 114) may participate in various payment networks, including, by way of example, payment network 112. One such payment network is operated by MasterCard International Incorporated, the assignee of the present disclosure.

Referring again to FIG. 1, after purchaser 102 presents payment mechanism 104 to merchant 106, merchant 106 may send a request message (indicated by arrow 126), which in some embodiments may be all or part of an authorization request, to acquiring bank 110 via point-of sale (POS) terminal 108 located at or otherwise controlled by merchant 106. In turn, acquiring bank 110 communicates with payment network 112 (indicated by arrow 128), and payment network 112 communicates with issuing bank 114 (indicated by arrow 130) to determine whether purchaser 102 is authorized to make transaction 124. Issuing bank 114 either approves or declines the authorization request and thereafter transmits a response back to merchant 106 (indicated by arrows 136, 138, and 140). Merchant 106 may then either complete or cancel purchase transaction 124, based upon the response to the request message.

If purchase transaction 124 is approved, the transaction amount associated therewith will be sent from issuing bank 114 through payment network 112 to acquiring bank 110. The transaction amount, minus certain fees, will thereafter be deposited within a bank account belonging to merchant 106, in accordance with a process called settlement. Issuing bank 114 thereafter bills purchaser 102 (indicated by arrow 132) for all purchase transactions conducted over a given period of time by sending a statement to purchaser 102. Purchaser 102 responds by submission of payment(s) (as indicated by arrow 134) to issuing bank 114. This submission of payment(s) (as indicated by arrow 134) by purchaser 102 may be automated (e.g., in the case of debit transactions), may be initiated by purchaser 102 for the exact amount matching amounts of purchases during the statement period (e.g., charge cards or credit balances paid in full), and/or may be submitted (in part or in whole) over a period of time that thereby reflects the amount of the purchases, plus any financing charges agreed upon beforehand between purchaser 102 and issuing bank 114 (e.g., revolving credit balances).

Payment network 112 may include at least one of each of the following: storage, servers, and mainframes (none of which are shown in FIG. 1, but each of which will be appreciated by one of skill in the art upon studying the present disclosure). The mainframes may include a processing device and may be configured to implement the authorization and clearing process, with such configuration and/or associated instructions being stored in the storage and through various network connections to respective counterpart computer systems at issuing bank 114 and acquiring bank 110. The storage may include computer-readable-media storage technologies, such as a floppy drive, hard drive, tape drive, flash drive, optical drive, read-only memory (ROM), random access memory (RAM), and/or the like. The servers and the storage may be controlled by software/hardware and may store data and/or instructions to allow the mainframes to operate in accordance with aspects of the present disclosure. POS terminal 108 is in data communication, directly or indirectly, and at least from time to time, with, e.g., an acquirer host computer (not shown) that is part of payment network 112, and that is operated for or on behalf of acquiring bank 110, which handles payment card transactions for merchant 106. The server may be operated by or on behalf of the payment network 112, and may provide central switching and message routing functions among the member financial institutions of payment network 112. Issuing bank 114 also may make use of an issuer host computer (not shown), and an access point (not shown), via which the issuer host computer exchanges data messages with the server.

It should be noted that, in practice, payment card transaction processing system 100 may involve a number of cardholders/purchasers 102, POS terminals 108, merchants 106, acquirer host computers, issuer host computers, and access points, as well as a number of respective acquiring and issuing banks 110 and 114. In general, the acquirer host computer may receive authorization requests from POS terminals 108, forward the authorization requests through payment network 112, receive authorization responses, and relay the authorization responses back to POS terminal 108. Moreover, the issuer host computer may, in general, receive authorization requests from the servers and transmit authorization responses back to the server based on the authorization requests.

Also included in a typical card-based payment system transaction are the clearing and settlement processes described above. Clearing (which may happen after transmission of the authorization response if approved) may refer to a process by which issuing bank 114 exchanges transaction information with acquiring bank 110 (also referred to as merchant bank). Referring again to FIG. 1, acquiring bank 110 may transmit transaction information to payment network 112, which may include a clearing system (not shown in FIG. 1). The clearing system may validate the transaction information and forward it to issuing bank 114, which prepares data to be included on a payment statement for purchaser 102. The clearing system 114 may then provide reconciliation data to both issuing bank 114 and acquiring bank 110.

Settlement may refer to a process by which issuing bank 114 exchanges the requisite funds with acquiring bank 110 to complete an approved transaction. In particular, acquiring bank 110 may send clearing data in a clearing message to payment network 112, whereupon payment network 112 calculates a net settlement position and sends advisement to acquiring bank 110 and issuing bank 114. Issuing bank 114 may remit payment to payment network 112, which then sends the payment to acquiring bank 110. Acquiring bank 110 then pays merchant 106 for the purchase made by purchaser 102, and issuing bank 114 bills purchaser 102.

Having provided this context for payment card transaction processing system 100, specific embodiments of the present disclosure will now be described. One of skill in the art will recognize, upon studying the present disclosure, that system 100 merely represents one way in which large data sets are generated, processed, and/or transferred, and that system 100 may be modified to represent other environments in which such data sets are generated, such as in the medical records, retail, government, and other contexts. Such modifications are within the scope of the present disclosure. Further, as will be understood by one of skill in the art, the above-described processing of transactions typically involves a significant amount of data being generated, stored, and transferred, for example using payment network 112. In this regard, payment card transaction processing systems, such as system 100, typically utilize database capabilities within or in conjunction with payment network 112 to store, sort, and analyze transaction data associated with the transactions processed through system 100.

Figure 2:
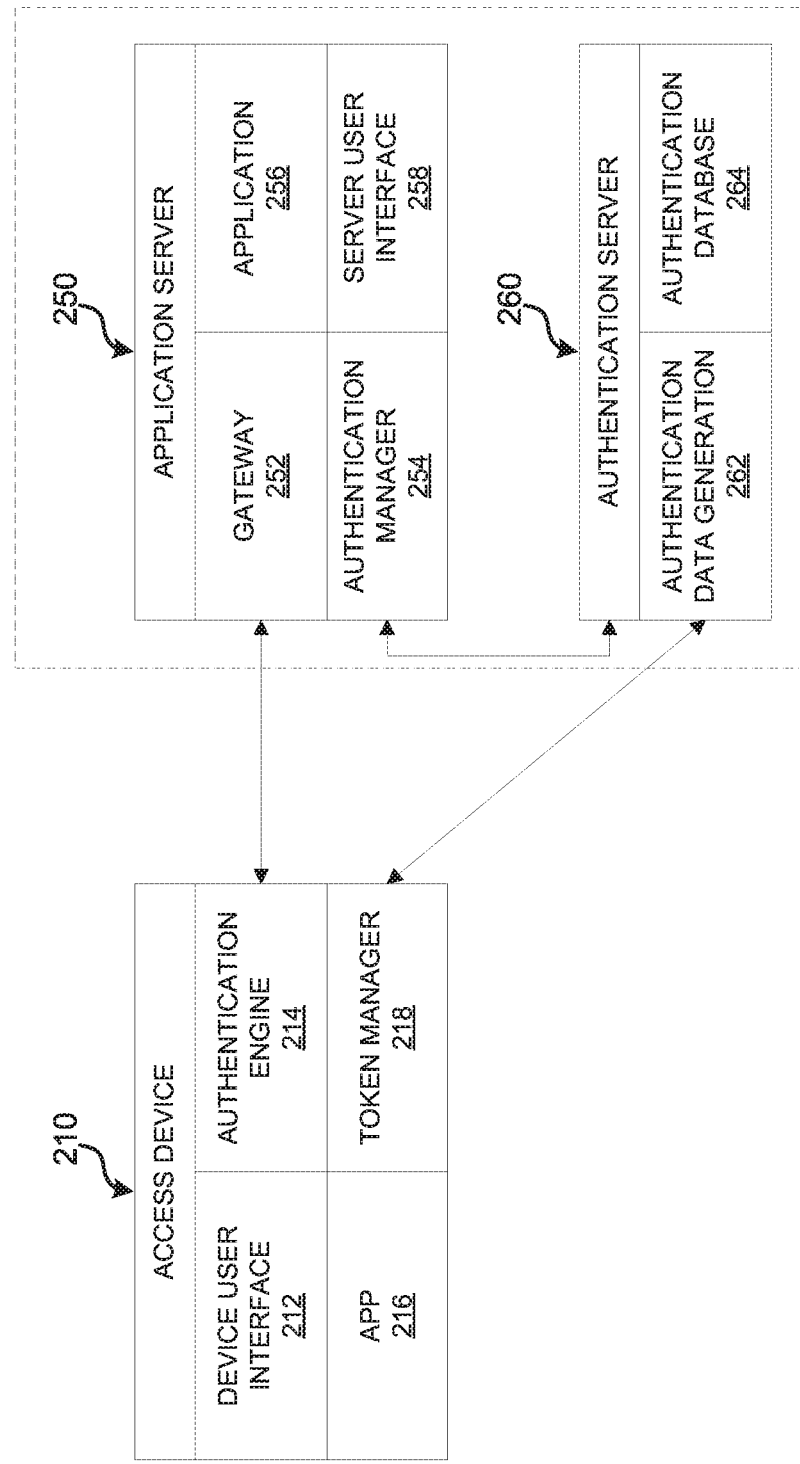
FIG. 2 illustrates an example of a one-time passcode authentication system, consistent with embodiments disclosed herein.

FIG. 2 illustrates an example of a one-time passcode authentication system. Referring to FIG. 2, a one-time passcode authentication system includes an application server 250, an authentication server 260, and an access device 210, each of which communicate using one or more computer networks (e.g., the Internet, a local area network, a wireless network, a cellular network, or other computer networks as known in the art). Application server 250 and authentication server 260 may each exist on dedicated computer hardware, or they may coexist on the same physical computer hardware. Access device 210 may be a mobile telephone such as a smart phone, a tablet computer, a point-of-sale terminal, a laptop computer, a desktop computer, a computer server, an automobile computer, a smart watch, a personal data assistant, or any other electronic device in which user authentication may be applicable, as known in the art. For purposes of describing embodiments of this disclosure, the one-time passcode systems and methods will be illustrated in the context of smart phone access device, but one of skill in the art would understand the systems and methods disclosed herein are applicable to the other types of access devices listed above.

Application server 250 may include a gateway component 252, an application component 256, an authentication manager component 254, and a server user interface component 258. For example, application component 256 may include a computer processor and a non-transitory computer readable media with application software embedded thereon, the application software being configured to cause the computer processor to perform desired functions. The application software may include applications known in the art, e.g., for managing financial information or transactions, managing healthcare transactions, managing retail or wholesale transactions, or other applications that require security and authentication mechanisms.

Gateway component 252 may also include a non-transitory computer readable media with gateway software embedded thereon, the gateway software being configured to cause the processor to control access to the application component 256 based on a determination as to whether the user initiating the request has been authenticated.

Server user interface component 256 may also include a non-transitory computer readable media with server user interface software embedded thereon, the server user interface software being configured to cause the processor to display a user interface on a standard output device (e.g., a display, touchscreen, projector, speaker, or other output device as known in the art) and enabling a user to interact with the application component via a standard input device (e.g., a keyboard, mouse, touchscreen, microphone, or other input device as known in the art). For example, the server user interface component may enable the user to initiate an one-time passcode authentication request through the application component by inputting information sufficient to identify a desired access device 210, e.g., by entering a mobile phone number, email address, messenger or social media handle, or other identification data.

Authentication manager 254 may also include a non-transitory computer readable media with authentication manager software embedded thereon, the authentication manager software being configured to cause the processor to send an authentication request to authentication server 260 in response to receiving the authentication request from the server user interface component 258 or application component 256. For example, the authentication request may include request data, including parameters identifying the desired access device 210, login credentials (e.g., a user name, full name, other user-identifying information), an application server or application component address to enable the access device to initiate an access request to the application software, and other access control parameters such as time or date ranges or limits or access device configuration requirements (i.e., minimum operating system, browser, app version, security patch level, etc.).

Still referring to FIG. 2, authentication server 260 may include authentication data generation component 262 and authentication database 264. Authentication data generation component 262 may include a computer processor (e.g., either a computer processor used by application server 250, a physically distinct computer processor, or both) and a non-transitory computer readable media with authentication data generation software embedded thereon, the authentication data generation software being configured to cause the computer processor to generate. authentication data and transmit the authentication data to access device 210. For example, authentication data may include an authentication token. Authentication data may also include some or all of the request data. The token may be calculated as a function of the request data, independent of the request data, or may be extracted from authentication database 256. In some examples, the token and the request data may be encrypted (e.g., using encryption algorithms known in the art) by the authentication data generation component 262 prior to transmitting to access device 210. Authentication data generation component 262 may use the request data to identify the address of access device 210, i.e., by phone number, email address, IP address, URL, or other addressing mechanism as known in the art. In some examples, authentication dataset 264 may store a copy of the token and request data for purposes of subsequently authenticating an attempted login to application server 250 from access device 210. Authentication database 264 may also store other authentication parameters that may be pre-registered or retrieved through external databases, such as biometric registrations, portions of or complete social security numbers, birth dates, names or maiden names of relatives, addresses or zip codes, etc.

Authentication server 260 may also be configured to verify access requests made to application server 250 through gateway 252. For example, access device 210 may initiate an access request to application server 250 in response to receiving authentication data from authentication server 260. In some examples, access device 210 may wait for user input before sending an access request to application server 250. The access request may include authentication data, such as the token, biometric data, identifying data from the access device, or other identifying information that may be sent by authentication manager 254 to authentication server 260 and then correlated with related authentication data stored in authentication database 264 to authenticate, and thus verify the access request.

Access device 210 may include authentication engine 214, token manager component 218, device user interface component 212, and app 216. For example, authentication engine 214 may include a computer processor and a non-transitory computer readable media with authentication engine software embedded thereon, the authentication engine software being configured to cause the computer processor to process authentication data received from authentication server 260 and initiate an access request to application server 250. In some examples, the authentication engine software may initiate the access request in response to receipt of the authentication data without the need for user input or verification. The access request includes the token and request data, as described above, and is directed towards invoking an user login to application component 256.

In other examples, the authentication engine software may cause the processor to prompt the user to input a response through device user interface 212. For example, device user interface 212 may include a non-transitory computer readable media with device user interface software embedded thereon, the device user interface software configured to cause information to display on an output device and accept user input from an input device. In some embodiments, the input device and output device is a touchscreen (e.g., a touchscreen display on a mobile telephone or tablet computer). The device user interface component may cause a prompt to display on the output device notifying the user of the authentication request identified by the authentication data received from authentication server 260, and requesting that the user initiate an access request to application server 250.

In some examples, the user may then initiate the access request by merely clicking on an icon displayed on the output device, at which time the access request will be transmitted to the application server 250 and verified against the authentication data using authentication server 260. In response, app 216 may login to application server 250 and enable user interaction with application server 250 via device user interface 212 in conjunction with app component 216. For example, app component 216 may be a customized app, installed on access device 210, and configured to interact with application component 256 after authentication through gateway 252 in response to an authentication request. App component 216 may also be a standard web browser, social media app, chat app, or other known communication app that requires authentication.

In some examples, device user interface 212 may also include a biometric sensor, such as a fingerprint sensor, retinal scanner, facial recognition device such as a camera, or other biometric device. Authentication engine 214 may receive additional request data from the biometric sensor to further identify and authenticate the user. For example, the authentication data received by authentication engine 214 may trigger device user interface to cause the processor to display a prompt on the output device requesting a biometric input, such as a fingerprint authentication, and the user may then provide the biometric input, e.g., by touching a fingerprint sensor, which then automatically triggers authentication engine 214 to transmit to application server 250 the request data, including the token received from token manager 218, and a biometric authentication data set. In some examples, the biometric data may be authenticated locally, and a flag may be sent to application server 250 indicating that the local biometric authentication was confirmed. In other examples, the biometric authentication data set is generated on access device 210, but sent to application server 250 for server-side authentication.

In some embodiments, authentication engine 214 causes the device user interface component to display a notification. In some examples, the notification may include a prompt to launch app 216. Once app 216 is launched on access device 210 and initiates communication with application server 250, gateway 252 may send a request for login credentials (i.e., a login screen) to app 216, at which time authentication engine 214 may also receive the request for login credentials and auto-populate a set of credential fields on the login screen (e.g., with a username and passcode token received from token manager 218), using the authentication data.

In each of the embodiments described above, a one-time passcode authentication may be triggered by application server 250 to access device 210, and access device 210 may implement the one-time login with minimal interaction from the user (i.e., either no interaction, or at most, a single click).

Figure 3:
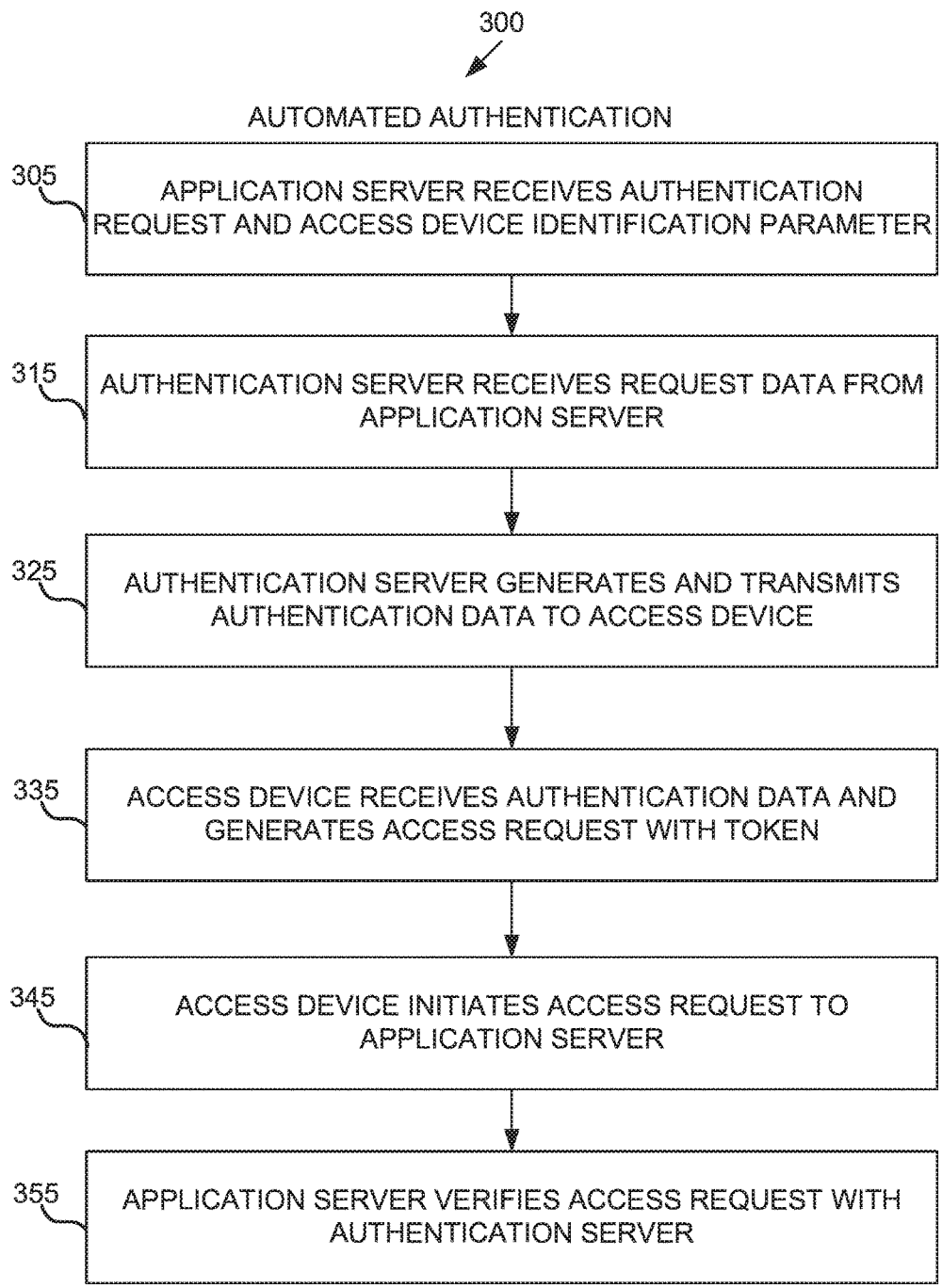
FIG. 3 illustrates an example of a one-time passcode authentication process using automated authentication, consistent with embodiments disclosed herein.

FIG. 3 illustrates an example of a one-time passcode authentication process using automated authentication. Referring to FIG. 3, authentication process 300 includes receiving, with an application server (e.g., application server 250), an authentication request and authentication device identification information at step 305. For example, the authentication request may be initiated by an administrator or power user through a server user interface, and the device identification information may include information sufficient to uniquely identify an access device (e.g., access device 210), such as a phone number, IP address, URL, email address, or other information unique to the device.

Authentication process 300 also includes receiving, with an authentication server (e.g., authentication server 260), request data from the application server at step 315. The authentication process also includes generating and transmitting authentication data to the access device at step 325. For example, the authentication data may be generated based on the request data. The generating of the authentication data may further include generating a token and including the token in the authentication data transmitted to the access device. In some examples, generating the authentication data includes encrypting the authentication data. Transmitting the authentication data to the access device may include transmitting the authentication data using TCP/IP, SMTP, HTTP, HTTPS, FTP, sFTP, SMS, MMS, or other known network communication protocols.

Authentication process 300 also includes receiving, with the access device, authentication data and generating an access request at step 335. For example, the access request may include the token, and other information sufficient to identify the user or access device, including a name, login, email address, IP address, or phone number. The request data may incorporate data extracted from the authentication request, including the token. In examples where the authentication request is encrypted, the step of receiving the access request may include decrypting the authentication data. In the example of an automated authentication process, as illustrated in FIG. 3, the access device automatically initiates the access request (e.g., by transmitting request data) to the application server at step 345. In some embodiments, the request data may be encrypted by the access device prior to transmission. The transmitting of the request data may be implemented using one or more of the network communications protocols described above. The authentication process 300 may also include verifying the access request by querying the authentication server (i.e., and the authentication database 264) to verify the access data against the authentication data used to initiate the authentication request. Once authenticated, the access device allows a user to interact (e.g., through) a device user interface controlled by an app on the device) with an application on the application server.

Figure 4:
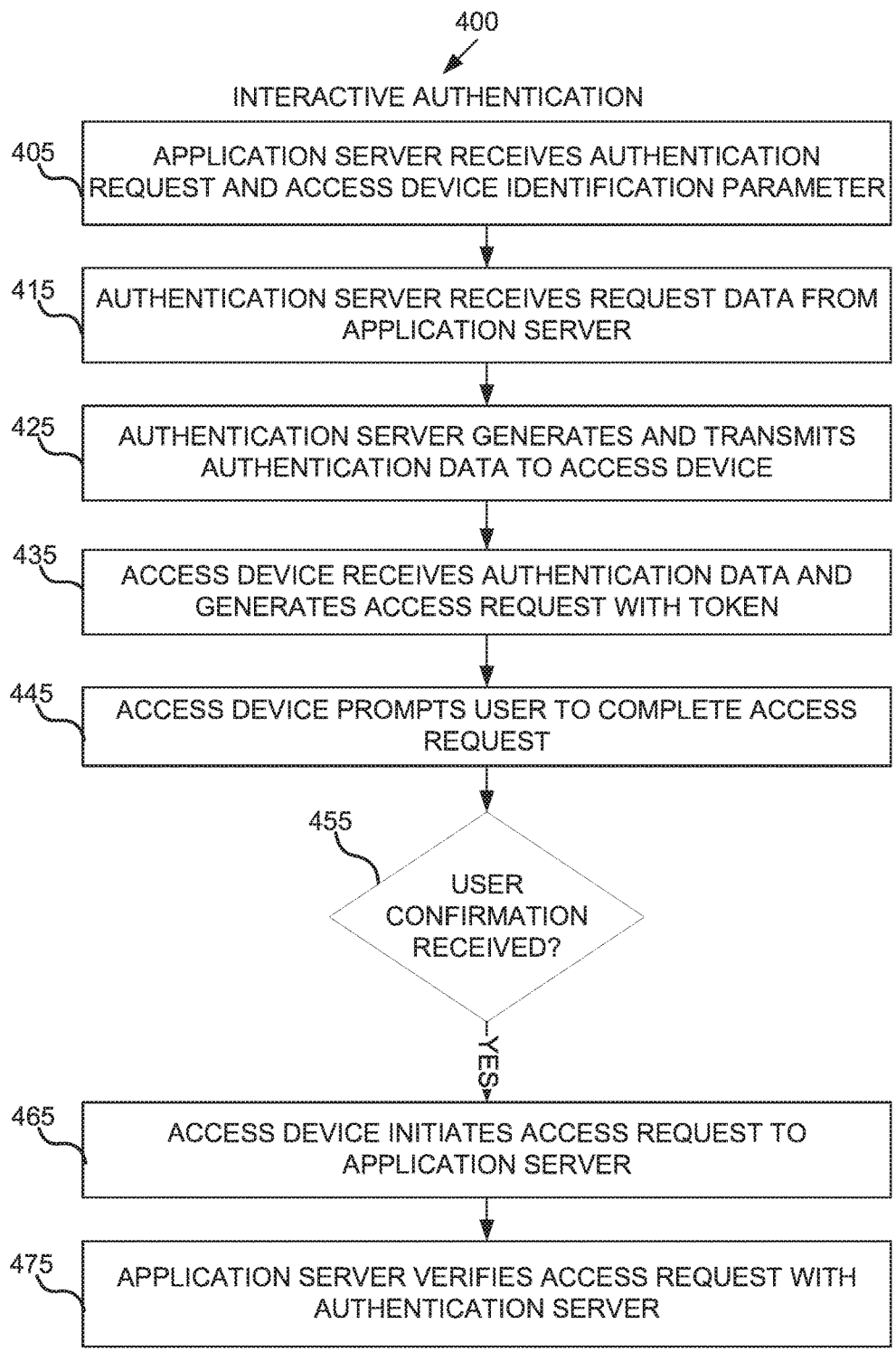
FIG. 4 illustrates an example of a one-time passcode authentication process using interactive authentication, consistent with embodiments disclosed herein.

FIG. 4 illustrates an example of a one-time passcode authentication process using interactive authentication. Similar to automated authentication process 300, interactive authentication process 400 includes receiving, with an application server, an authentication request and authentication device identification information at step 405, receiving, with an authentication server, request data from the application server at step 415, and generating and transmitting authentication data to the access device at step 425. Authentication process 400 also includes receiving, with the access device, the authentication data and generating an access request (e.g., incorporating a token and access data extracted from the authentication data) at step 435. The step of transmitting the authentication data to the access device may include encrypting the authentication data, and the step of receiving the authentication data with the access device may include decrypting the authentication data.

In the example of an interactive authentication process, as illustrated by FIG. 4, authentication process 400 also includes prompting the user, through a device user interface, to complete the access request at step 445 and waiting for the user to confirm that the request at step 455. The authentication process also includes initiating the access request to the application server, e.g., by transmitting the access data to the application server at step 465, if the user confirms the request, i.e., by clicking on an icon, checkbox, or other prompt acceptance mechanism as known in the art, then. The authentication process 400 may also include verifying the access request by querying the authentication server (i.e., and the authentication database 264) to verify the access data against the authentication data used to initiate the authentication request. Once authenticated, the access device allows a user to interact (e.g., through) a device user interface controlled by an app on the device) with an application on the application server.

Figure 5:
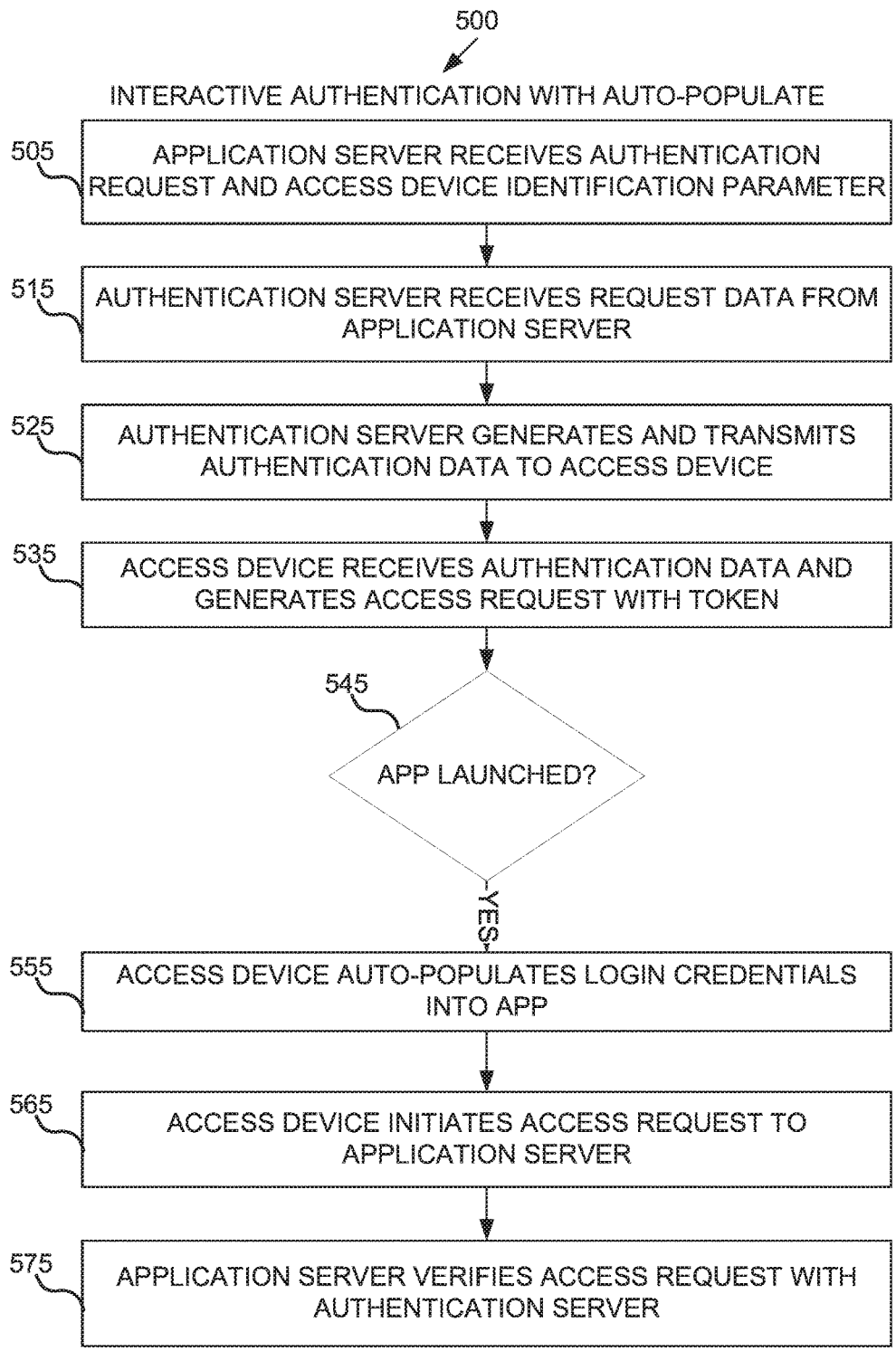
FIG. 5 illustrates an example of a one-time passcode authentication process using interactive authentication and auto-populate of login credentials, consistent with embodiments disclosed herein.

FIG. 5 illustrates an example of a one-time passcode authentication process using interactive authentication and auto-populate of login credentials. Similar to interactive authentication process 400, an interactive authentication process 500 incorporating an auto-populate of login credentials includes receiving, with an application server, an authentication request and authentication device identification information at step 505, receiving, with an authentication server, request data from the application server at step 515, generating and transmitting authentication data to the access device at step 525, receiving, with the access device, the authentication data and generating an access request at step 535. The step of transmitting the authentication data to the access device may include encrypting the authentication data, and the step of receiving the authentication data with the access device may include decrypting the authentication data.

In the example of an interactive authentication process using auto-populate of login credentials, as illustrated by FIG. 5, authentication process 500 also includes determining if an app (i.e., the app corresponding to or configured to access the application server) on the access device has been initiated, or a web page corresponding to the application server has been launched, at step 545 and auto-populating a set of login credentials into corresponding credential fields within the app or web page at step 555 if the app or web page has been launched. For example, the login credentials may be extracted from the request data. The authentication process 500 may also include initiating the access request to the application server at step 565 and verifying the access request by querying the authentication server (i.e., and the authentication database 264) to verify the access data against the authentication data used to initiate the authentication request at step 575.

Figure 6:
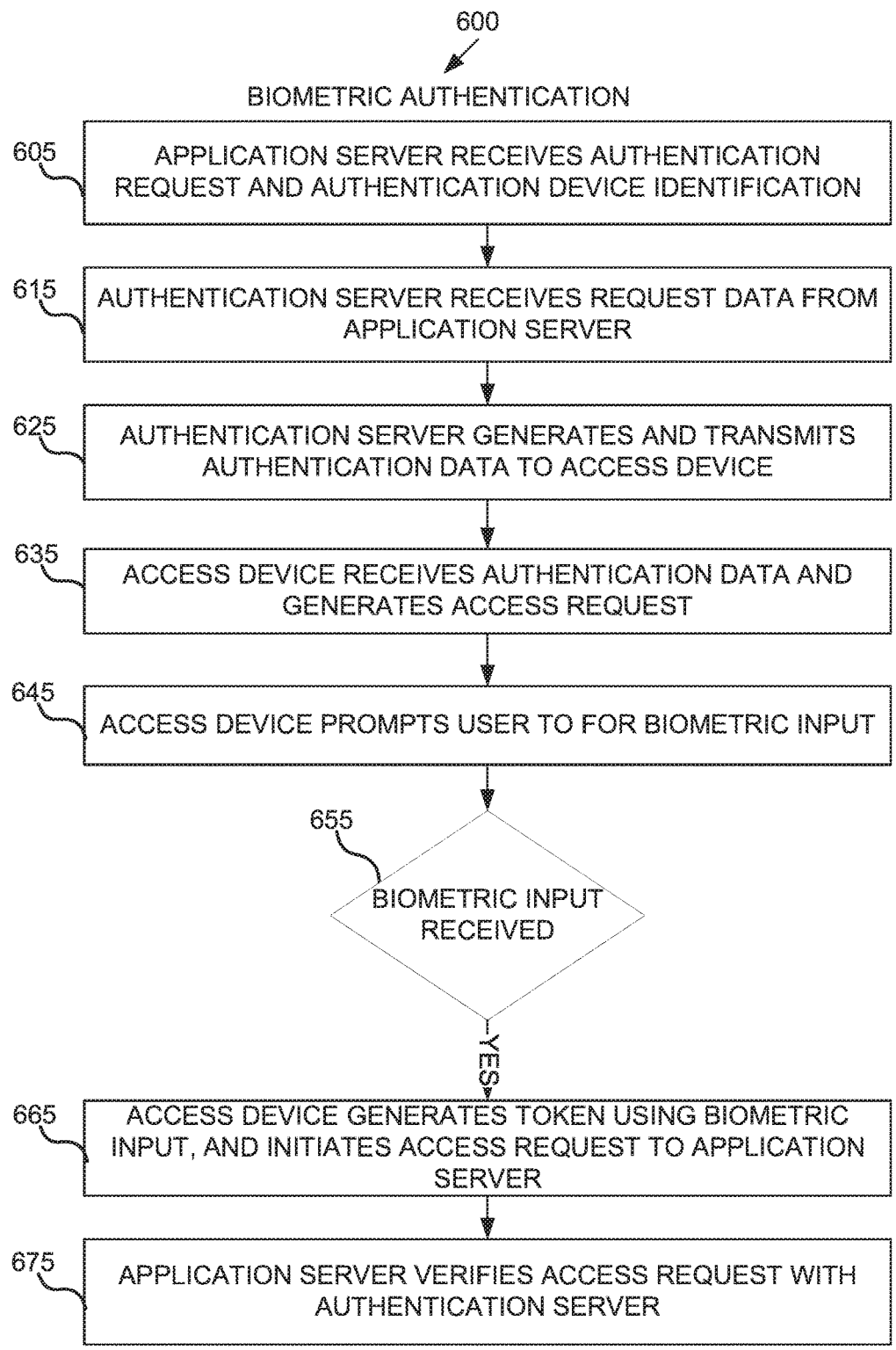
FIG. 6 illustrates an example of a one-time passcode authentication process using biometric authentication, consistent with embodiments disclosed herein.

FIG. 6 illustrates an example of a one-time passcode authentication process using biometric authentication. Also similar to interactive authentication process 400, biometric authentication process 600 includes receiving, with an application server, an authentication request and authentication device identification information at step 605, receiving, with an authentication server, request data from the application server at step 615, generating and transmitting authentication data to the access device at step 625, receiving, with the access device, the authentication data and generating an access request at step 635. The step of transmitting the authentication data to the access device may include encrypting the authentication data, and the step of receiving the authentication data with the access device may include decrypting the authentication data.

In the example of a biometric authentication process as illustrated by FIG. 6, authentication process 600 also includes prompting the user (i.e., by generating a prompt with a device user interface) for a biometric input at step 645 and determining if the biometric input has been received at step 655. For example, the biometric input may be a fingerprint scan, a retinal scan, a facial recognition scan, a voice recognition process, or other biometric authentication mechanism as known in the art. The authentication process 600 may also include generating, with the access device, a token using the biometric input and the authentication data. Alternatively, the access device may simply generate request data that includes data from the biometric input and the authentication data. The authentication process 600 may also include initiating the access request to the application server at step 665 and verifying the access request by querying the authentication server (i.e., and the authentication database 264) to verify the access data against the authentication data used to initiate the authentication request at step 675.

Figure 7:
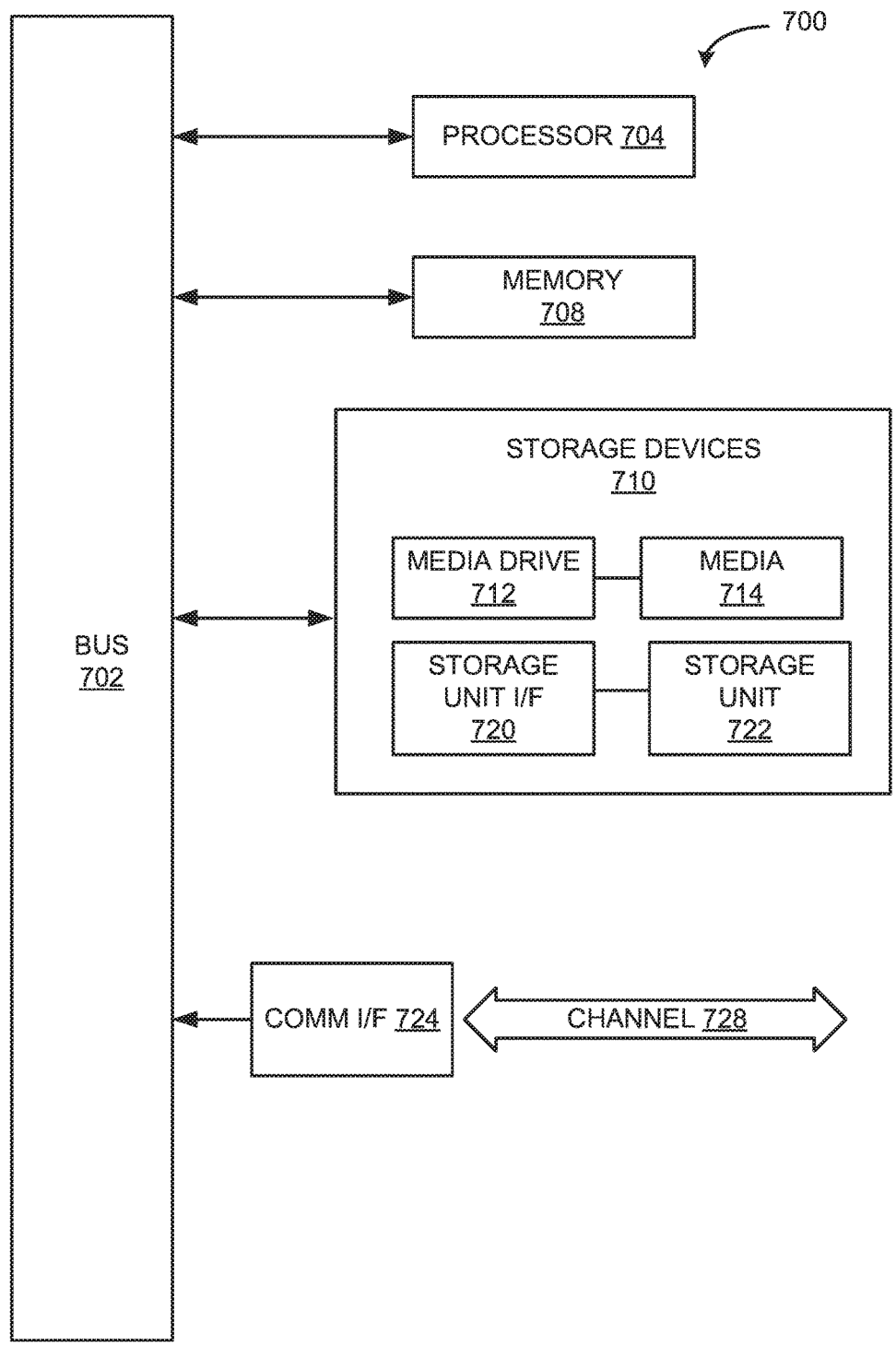
FIG. 7 illustrates an example computing component that may be used in implementing features of various embodiments of the present disclosure.

As used herein, the term component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. In implementation, the various components described herein might be implemented as discrete components or the functions and features described can be shared in part or in total among one or more components. In other words, as would be apparent to one of ordinary skill in the art after reading this description, the various features and functionality described herein may be implemented in any given application and can be implemented in one or more separate or shared components in various combinations and permutations. Even though various features or elements of functionality may be individually described or claimed as separate components, one of ordinary skill in the art will understand that these features and functionality can be shared among one or more common software and hardware elements, and such description shall not require or imply that separate hardware or software components are used to implement such features or functionality.

Where components of the application are implemented in whole or in part using software, in one embodiment, these software elements can be implemented to operate with a computing or processing component capable of carrying out the functionality described with respect thereto. One such example computing component is shown in FIG. 7. Various embodiments are described in terms of this example-computing component 700. After reading this description, it will become apparent to a person skilled in the relevant art how to implement the application using other computing components or architectures.

FIG. 7 illustrates an example computing component 700, an example of which may be a processor for executing the business ecosystem tool used to implement various features and/or functionality of the systems and methods disclosed in the present disclosure. Computing component 700 may represent, for example, computing or processing capabilities found within desktop, laptop, notebook, and tablet computers; hand-held computing devices (tablets, PDA's, smart phones, cell phones, palmtops, etc.); mainframes, supercomputers, workstations or servers; or any other type of special-purpose or general-purpose computing devices as may be desirable or appropriate for a given application or environment. Computing component 500 might also represent computing capabilities embedded within or otherwise available to a given device. For example, a computing component might be found in other electronic devices such as, for example, digital cameras, navigation systems, cellular telephones, portable computing devices, modems, routers, WAPs, terminals and other electronic devices that might include some form of processing capability.

Computing component 700 might include, for example, one or more processors, controllers, control components, or other processing devices, such as a processor 704. Processor 704 might be implemented using a general-purpose or special-purpose processing engine such as, for example, a microprocessor, controller, or other control logic. In the illustrated example, processor 704 is connected to a bus 702, although any communication medium can be used to facilitate interaction with other components of computing component 700 or to communicate externally.

Computing component 700 might also include one or more memory components, simply referred to herein as main memory 708. For example, preferably random access memory (RAM) or other dynamic memory might be used for storing information and instructions to be executed by processor 704. Main memory 708 might also be used for storing temporary variables or other intermediate information during execution of instructions to be executed by processor 704. Computing component 700 might likewise include a read only memory ("ROM") or other static storage device coupled to bus 702 for storing static information and instructions for processor 704.

The computing component 700 might also include one or more various forms of information storage devices 710, which might include, for example, a media drive 712 and a storage unit interface 720. The media drive 712 might include a drive or other mechanism to support fixed or removable storage media 714. For example, a hard disk drive, a floppy disk drive, a magnetic tape drive, an optical disk drive, a CD or DVD drive (R or RW), or other removable or fixed media drive might be provided. Accordingly, storage media 714 might include, for example, a hard disk, a floppy disk, magnetic tape, cartridge, optical disk, a CD or DVD, or other fixed or removable medium that is read by, written to or accessed by media drive 712. As these examples illustrate, the storage media 714 can include a computer usable storage medium having stored therein computer software or data.

In alternative embodiments, information storage devices 710 might include other similar instrumentalities for allowing computer programs or other instructions or data to be loaded into computing component 700. Such instrumentalities might include, for example, a fixed or removable storage unit 722 and an interface 720. Examples of such storage units 722 and interfaces 720 can include a program cartridge and cartridge interface, a removable memory (for example, a flash memory or other removable memory component) and memory slot, a PCMCIA slot and card, and other fixed or removable storage units 722 and interfaces 720 that allow software and data to be transferred from the storage unit 722 to computing component 700.

Computing component 700 might also include a communications interface 724. Communications interface 724 might be used to allow software and data to be transferred between computing component 700 and external devices. Examples of communications interface 724 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 724 might typically be carried on signals, which can be electronic, electromagnetic (which includes optical) or other signals capable of being exchanged by a given communications interface 724. These signals might be provided to communications interface 724 via a channel 728. This channel 728 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media such as, for example, memory 708, storage unit 720, media 714, and channel 728. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 700 to perform features or functions of the present application as discussed herein.

Various embodiments have been described with reference to specific exemplary features thereof. It will, however, be evident that various modifications and changes may be made thereto without departing from the broader spirit and scope of the various embodiments as set forth in the appended claims. The specification and figures are, accordingly, to be regarded in an illustrative rather than a restrictive sense.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the present application, whether or not such embodiments are described and whether or not such features are presented as being a part of a described embodiment. Thus, the breadth and scope of the present application should not be limited by any of the above-described exemplary embodiments.

Terms and phrases used in the present application, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the components or functionality described or claimed as part of the component are all configured in a common package. Indeed, any or all of the various components of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system for providing one-time passcode authentication, the system comprising:
   an application server configured to receive access requests, the application server comprising a second computer processor and a second non-transitory computer-readable medium having a second computer-executable program embedded thereon;
   an authentication server-configured to receive authentication requests, the authentication server comprising a third computer processor and a third non-transitory computer-readable medium having a third computer-executable program embedded thereon; and
   an access device, the access device configured to receive and process authentication requests from the authentication server and initiate access requests to the application server, the access device comprising:
      an authentication engine; and
      a device user interface component comprising a biometric input device, configured to display a prompt, responsive to the authentication request, querying a user to accept the authentication request;
   wherein the authentication engine comprises a first computer processor and a first non-transitory computer-readable medium having a first computer-executable program embedded thereon, the first computer-executable program being configured to receive an authentication request from the authentication server and initiate an access request to the application server in response to the authentication request, wherein the access request comprises a token extracted from the authentication request, to receive an input message comprising a biometric identification from the device user interface component, and to initiate the access request to the application server only if the input message indicates that the user accepted the authentication request; and
   the second computer-executable program of the application server being configured to receive the access request from the authentication engine, query the authentication server to authenticate the token, enable access to an application if the token is authenticated, and auto-populate a set of login credentials within the application, wherein the set of login credentials are extracted from the access request, and wherein the application is being accessed on the application server.

2. The system of claim 1, wherein the third computer-executable program of the authentication server is configured to receive an authentication data set from the application server and generate the authentication request based on the authentication data set, such that the authentication request comprises one or more parameters extracted from the authentication data set and the token.

3. The system of claim 2, wherein the authentication data comprises an electronic address that uniquely identifies the access device or a user.

4. The system of claim 3, wherein the electronic address that uniquely identifies the access device or a user comprises a phone number, an IP address, or an email address.

5. The system of claim 2, wherein the authentication data generation component is further configured to encrypt the authentication request and the first computer-executable program is further configured to decrypt the authentication request.

6. The system of claim 1, wherein the first computer-executable program is further configured to encrypt the access request, and the second computer-executable program is further configured to decrypt the access request.

7. The system of claim 1, wherein the first computer-executable program is further configured to cause the device user interface component to display the prompt, responsive to the authentication request, querying the user to accept the authentication request.

8. The system of claim 1, wherein the biometric input device comprises a fingerprint scanner or a retinal scanner.

9. A computer implemented one-time passcode authentication method comprising:
   receiving, with an authentication server, a request data set comprising an authentication request and an identification parameter, wherein the identification parameter uniquely identifies an access device or a user;
   generating, with the authentication server, a token and an authentication data set based on the authentication request and the identification parameter;
   receiving, with the access device, the authentication data set from the authentication server;
   initiating, with the access device, an access request to an application server responsive to receiving the authentication data set, wherein the access request comprises the token; and
   auto-populating a set of login credentials within an application with the application server responsive to the initiated access request to the application server, wherein the set of login credentials are extracted from the access request.

10. The method of claim 9, further comprising querying the authentication server to authenticate the token, responsive to receiving the access request.

11. The method of claim 10, further comprising enabling, with the application server, access to an application if the token is authenticated.

12. The method of claim 9, wherein the identification parameter comprises a phone number, an IP address, or an email address.

13. The method of claim 9, further comprising encrypting the authentication data set.

14. The method of claim 13, further comprising encrypting the access request.

15. The method of claim 9, further comprising displaying, with a user interface configured on the access device, an authentication prompt responsive to receiving the authentication data set.

16. The method of claim 15, further comprising receiving, with the user interface, an input message from the user responsive to the authentication prompt and initiating the access request to the application server only if the input message indicates that the user accepted the authentication prompt.

17. The method of claim 15, further comprising receiving, with a biometric input device, a biometric input message from the user responsive to the authentication prompt and initiating the access request to the application server only if the biometric input message authenticates the user.

18. The method of claim 17, wherein the receiving the biometric input message comprises receiving a fingerprint scan or receiving a retinal scan.

* * * * *